Patented May 5, 1931

1,803,395

UNITED STATES PATENT OFFICE

MAX ALBERT KUNZ, OF MANNHEIM, GERMANY, ASSIGNOR TO GENERAL ANILINE WORKS, INC., OF NEW YORK, N. Y., A CORPORATION OF DELAWARE

MANUFACTURE OF VAT DYESTUFFS OF THE ANTHRAQUINONE SERIES

No Drawing. Original application filed February 9, 1926, Serial No. 87,173, and in Germany February 16, 1925. Divided and this application filed February 29, 1928. Serial No. 258,143.

The subject-matter of this application has been divided out from my co-pending application Ser. No. 87,173, filed February 9th, 1926.

I have found that valuable vat dyestuffs of excellent fastness are obtained by condensing aldehydes of the anthraquinone series with amino-anthraquinones or their substitution products. The reaction products are azo-methines corresponding to the general formula $A_1-CH=N-A_2$, in which $A_1$ and $A_2$ are the same or different anthraquinone radicles, otherwise substituted or not.

I have further found that it is often advantageous to prepare the new dyestuffs by acting with anthraquinone aldehydes not on the free amino-anthraquinones but on their azo-methine derivatives of the aryl series which are easily obtainable, for example, by condensing amino-anthraquinones with aldehydes of the benzene series. In the second reaction the aryl-aldehyde residue is replaced by the anthraquinone aldehyde radicle. The said reaction is of special value in case there are difficulties in the direct production of the new dyestuffs with a free amino-anthraquinone, for example on account of the amino-anthraquinone being difficultly soluble.

It is to be understood that I do not claim here the process of producing vat dyestuffs by condensing aldehydes of the anthraquinone series with free amino-anthraquinones or their substitution products.

The following examples will further illustrate how my invention may be carried out in practice, to which examples, however, the invention is not limited. The parts are by weight, if not otherwise stated.

Example 1

56 parts of 2-benzylidene-amino-anthraquinone are introduced into a boiling solution of 59 parts of 2-anthraquinone-aldehyde in 1000 parts, by volume, of nitrobenzene, whereupon the mixture is boiled for 1½ hours. After cooling, the precipitated dyestuff is filtered off by suction. The dyestuff, obtained according to the equation:

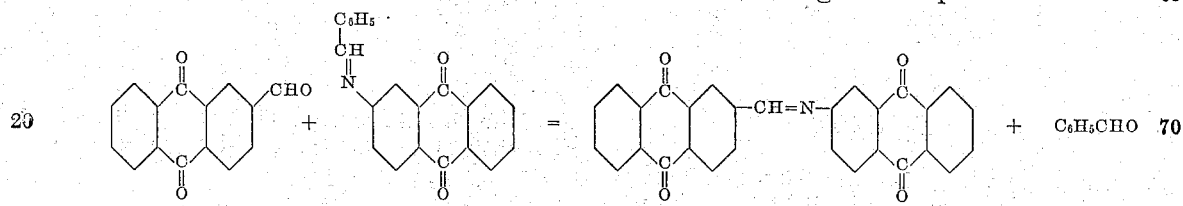

forms a brown powder which is soluble in the usual organic solvents with a brown color. With alkaline hydrosulfite, a dark brownish violet vat is formed from which cotton is dyed fast orange shades.

Example 2

59 parts of 2-anthraquinone-aldehyde, 1000 parts of nitrobenzene and 86 parts of 1-chlor-2-benzylidene-amino-anthraquinone are boiled for ½ hour. The dyestuff obtained according to the equation:

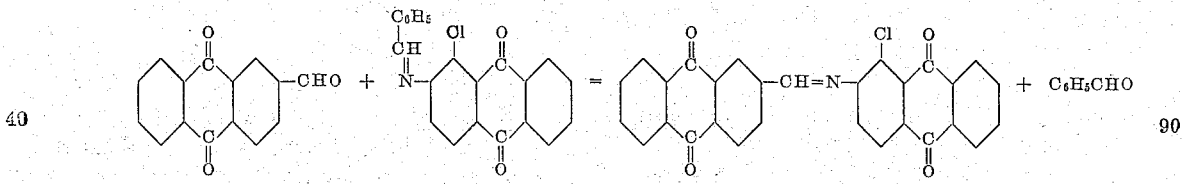

is a brownish yellow powder melting above 350° C., and which dyes cotton from a violet-black vat fast orange shades.

Example 3

118 parts of 2-anthraquinone-aldehyde are dissolved in 1500 parts, by volume, of boiling nitrobenzene and mixed with a hot solution of 104 parts of 2.6-dibenzylidene-diamino-anthraquinone in 1000 parts, by volume, of nitrobenzene. After boiling for some minutes, a yellow precipitate separates from the brown solution, which precipitate, after the mixture is cooled, is filtered off and washed. The dyestuff, obtained according to the equation:

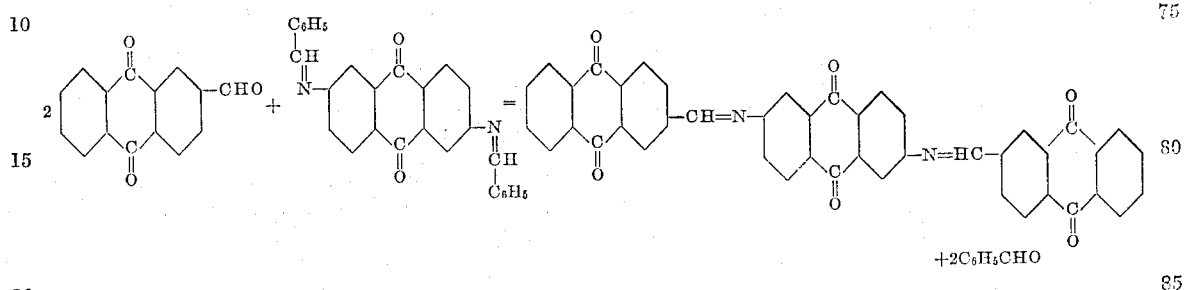

dyes cotton from an olive-black vat yellow shades of excellent fastness.

Example 4

125 parts of 1-amino-2-anthraquinone-aldehyde are dissolved in 2500 parts, by volume, of boiling nitrobenzene, whereupon a hot solution of 155 parts of 2-benzylidene-amino-anthraquinone in 1000 parts, by volume, of nitrobenzene is added. The mixture is boiled for ¾ hour. The dyestuff obtained according to the equation:

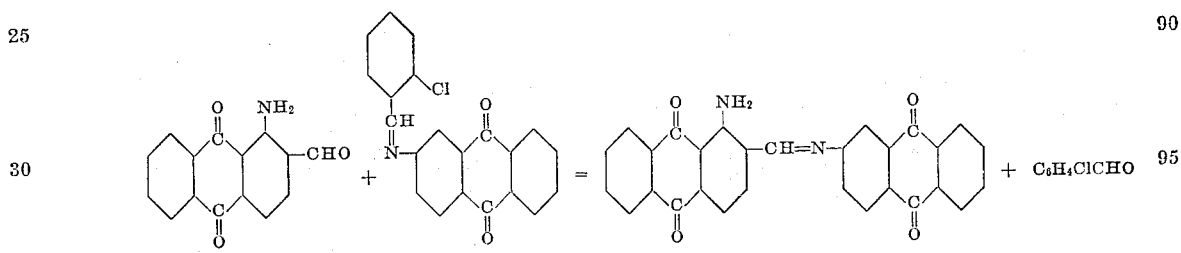

forms a reddish brown powder melting at 348 to 349 degrees centigrade. With alkaline hydrosulfite, it forms an olive-black vat from which cotton is dyed the same shade which, by washing and oxidation in the air, is altered to a strong claret red of excellent fastness.

Example 5

125 parts of 1-amino-2-anthraquinone-aldehyde, 3000 parts, by volume, of nitrobenzene and 175 parts of 2-(o-chlor-benzylidene-amino)-anthraquinone are boiled for ¾ hour. The product obtained according to the equation:

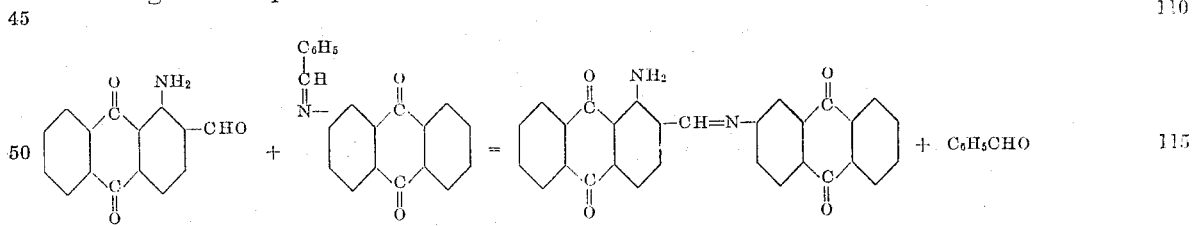

is worked up in the usual manner. It is identical with that obtained according to the foregoing example.

Example 6

62.5 parts of 1-amino-2-anthraquinone-aldehyde, 1500 parts, by volume, of nitrobenzene and 86.5 parts of 1-chlor-2-benzylidene-amino-anthraquinone are heated to boiling for 1 hour and worked up as usual. The dark reddish brown product obtained according to the equation:

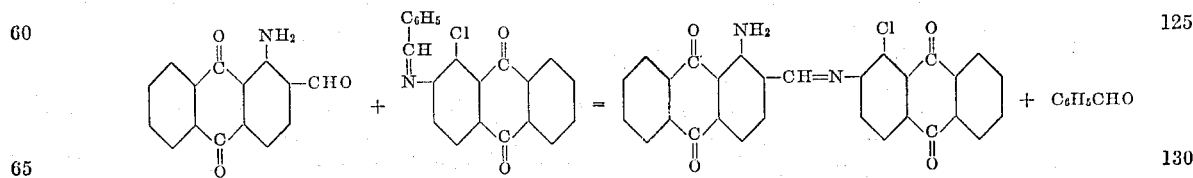

melts at 352 to 354 degrees centigrade, and the dyeings produced with this dyestuff are claret red.

Example 7

A mixture of 126 parts of 1-amino-2-anthraquinone-aldehyde, 3000 parts, by volume, of nitrobenzene and 163 parts of 2-benzylidene-amino-3-methyl-anthraquinone is boiled for ½ hour. The product obtained according to the equation:

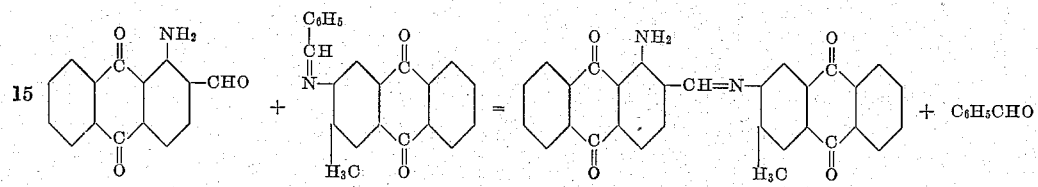

is worked up as described in the foregoing examples. A chocolate brown crystalline powder is obtained which melts above 340° C. and dyes cotton from an olive-black vat fast pink shades.

Example 8

A boiling solution of 50.2 parts of 1-amino-2-anthraquinone-aldehyde in 1000 parts, by volume, of nitrobenzene is mixed with a hot solution of 41.4 parts of 2.6-dibenzylidene-diamino-anthraquinone in 400 parts, by volume, of nitrobenzene. Almost immediately a voluminous reddish brown precipitate is separated from the boiling solution, which precipitate, after cooling, is filtered off and finished in the usual manner. The very pure product obtained according to the equation:

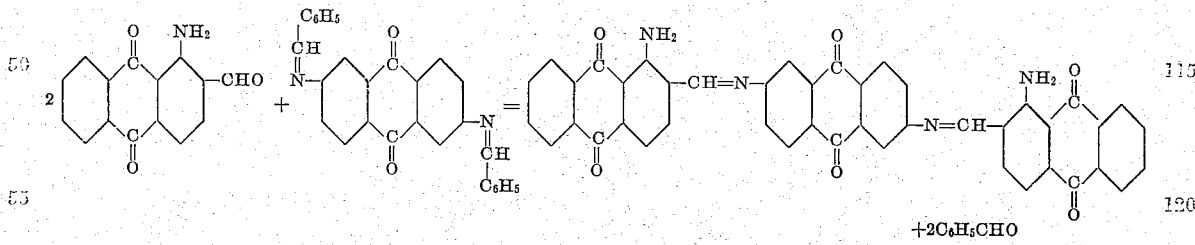

forms a reddish brown loose powder melting above 350° C. and dyeing cotton from a violet-black vat fast claret shades.

Example 9

A hot solution of 104 parts of 2.6-dibenzylidene-diamino-anthraquinone in 1000 parts, by volume, of nitrobenzene is introduced into a boiling solution of 135 parts of 1-chlor-2-anthraquinone-aldehyde in 1500 parts, by volume, of nitrobenzene. After some minutes, a fine crystalline yellow precipitate is separated from the boiling solution. The new product obtained according to the equation:

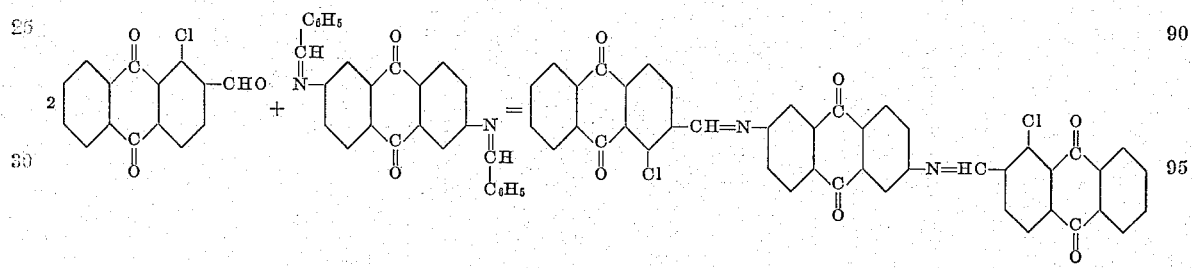

melts above 360° C. and dyes cotton from a dark olive-brown vat yellow shades of excellent fastness.

What I claim is:

The process of producing new compounds of the anthraquinone series which comprises acting with an anthraquinone aldehyde on a condensation product of an amino-anthraquinone with an aldehyde of the benzene series.

In testimony whereof I have hereunto set my hand.

MAX ALBERT KUNZ.